US011972345B2

(12) United States Patent
Poon et al.

(10) Patent No.: US 11,972,345 B2
(45) Date of Patent: Apr. 30, 2024

(54) MACHINE LEARNING BASED FILE RANKING METHODS AND SYSTEMS

(71) Applicant: Ernst & Young U.S. LLP, New York, NY (US)

(72) Inventors: Vincent Poon, Millbrae, CA (US); Nigel Paul Duffy, San Francisco, CA (US); Ravi Kiran Reddy Palla, Sunnyvale, CA (US)

( * ) Notice: Subject to any disclaimer, the term of this patent is extended or adjusted under 35 U.S.C. 154(b) by 973 days.

(21) Appl. No.: 16/381,505

(22) Filed: Apr. 11, 2019

(65) Prior Publication Data

US 2020/0327407 A1 Oct. 15, 2020

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ................. G06N 3/08; G06N 3/0454
See application file for complete search history.

(56) References Cited

U.S. PATENT DOCUMENTS

2019/0311202 A1* 10/2019 Lee .................. G06K 9/627

OTHER PUBLICATIONS

Deep Neural Network for Learning to Rank Query-Text Pairs, arXiv:1802.08988v1, Feb. 25, 2018 (Year: 2018).*
Gated siamese convolutional neural network architecture for human re-identification. European conference on computer vision. Springer, Cham, 2016 (Year: 2016).*
Geng et al. ("Deep transfer learning for person re-identification." arXiv preprint arXiv:1611.05244 (2016)) (Year: 2016).*
Li, Y. et al., "Improving Pairwise Ranking for Multi-label Image Classification," InProceedings of the IEEE conference on computer vision and pattern recognition, 2017, pp. 3617-3625.
Wang, J. et al., "CNN-RNN: A Unified Framework for Multi-label Image Classification," InProceedings of the IEEE conference on computer vision and pattern recognition, 2016, pp. 2285-2294.
Wei, Y. et al., "CNN: Single-label to Multi-label," arXiv preprint arXiv:1406.5726, Jun. 22, 2014, 14 pages.

* cited by examiner

*Primary Examiner* — Li B. Zhen
*Assistant Examiner* — Moriam Mosunmola Godo
(74) *Attorney, Agent, or Firm* — COOLEY LLP (57) ABSTRACT

A multi-label ranking method includes receiving, at a processor and from a first set of artificial neural networks (ANNs), multiple signals representing a first set of ANN output pairs for a first label. A signal representing a second set of ANN output pairs for a second label different from the first label is received at the processor from a second set of ANNs different from the first set of ANNs, substantially concurrently with the first set of ANN output pairs. A first activation function is solved based on the first set of ANN output pairs, and a second activation function is solved based on the second set of ANN output pairs. Loss values are calculated based on the solved activations, and a mask is generated based on at least one ground truth label. A signal, including a representation of the mask, is sent from the processor to each of the sets of ANNs.

20 Claims, 6 Drawing Sheets

MACHINE LEARNING BASED FILE RANKING METHODS AND SYSTEMS

TECHNICAL FIELD

The present disclosure relates to document management systems, and more particularly, to the prediction of relevancies of portions of documents using a machine learning framework.

BACKGROUND

Content-based document management systems can be used to classify a text document, for example by assigning one or more classes to the text document. Artificial neural networks (ANNs) are computing models that are used as general learnable function approximations.

SUMMARY

In some embodiments, a multi-label ranking method includes receiving, at a processor and from a first set of artificial neural networks (ANNs), multiple signals representing a first set of ANN output pairs uniquely associated with a first label and not associated with a second label different from the first label. A signal representing a second set of ANN output pairs uniquely associated with the second label and not associated with the first label is received at the processor from a second set of ANNs different from the first set of ANNs, substantially concurrently with the first set of ANN output pairs. A first activation function is solved by the processor based on the first set of ANN output pairs, to produce a first solved activation function, and a second activation function is solved by the processor based on the second set of ANN output pairs to produce a second solved activation function. Loss values are calculated based on the first solved activation function and the second solved activation function, and a mask is generated based on at least one ground truth label. A signal, including a representation of the mask, is sent from the processor to each of the first set of ANNs and the second set of ANNs, such that the first set of ANNs and the second set of ANNs collectively refine a ranking model hosted by the first set of ANNs and the second set of ANNs.

In some embodiments, a multi-label ranking apparatus includes a processor and a memory operably coupled to the processor. The memory stores processor-executable instructions to receive a plurality of artificial neural network (ANN) output pairs, and to generate a mask based on the plurality of ANN output pairs. Each ANN output pair from the plurality of ANN output pairs is associated with a different label from a plurality of labels. The generating includes, for each ANN output pair from the plurality of ANN output pairs: detecting whether a first ANN output of that ANN output pair is preferred over a second ANN output of that ANN output pair; in response to detecting a lack of preference between the first ANN output and the second ANN output, setting an indication that a portion of the mask will not cause an adjustment to a label weighting for that ANN output pair; and in response to detecting a preference between the first ANN output and the second ANN output, setting an indication that the portion of the mask will cause an adjustment to the label weighting for that ANN output pair. The memory also stores processor-executable instructions to transmit a signal, including the mask, from the processor to each of the first ANN and the second ANN, such that the first ANN and the second ANN collectively update a ranking model hosted by the first ANN and the second ANN.

In some embodiments, a method for multi-label ranking includes receiving, at a processor and from a plurality of ANNs, a plurality of signals representing an associated plurality of ANN output pairs associated with a label. The method also includes calculating, at the processor, loss values based on the plurality of ANN output pairs, and defining, at the processor, a mask based on at least one ground truth label. A signal, including a representation of the mask, can be transmitted from the processor to each ANN from the plurality of ANNs, to update a ranking model of the plurality of ANNs.

DETAILED DESCRIPTION

The review and auditing of documents such as contracts (e.g., leases) and other files is often performed manually, by an auditor who reads through the documents to identify pieces of information of interest. Some known computerized models for reviewing electronic files perform ranking of text-based files (e.g., documents) or portions thereof, such as pair-wise ranking models, are designed to rank based on a single class (or field). Ranking files based on more than one class, using known techniques, therefore typically involves creating multiple distinct models (i.e., a separate ranking model for each class). A drawback to such approaches is that they fail to account for correlations between labels of a given file/document. Moreover, adding a new label to a ranking model would typically involve retraining of the ranking model from scratch. Known pair-wise ranking approaches include, for example, RankingSVM, RankBoost, GBRank, IRSVM, RankNet, LambdaRank, and LambdaMART. Labels, as defined herein, are identifiers or classifications that are uniquely associated with associated discrete portions of data (e.g., text strings). Labels are also referred to herein as classes or fields.

Other known ranking systems are multi-label; such systems, however, typically limit the ranking to labels for a given file, and do not take into account a user's relative preference of samples taken from the file. Examples of known multi-label ranking systems are set forth, for example, in Y. Li et al 2017, J. Wang et al 2016, Y. Wei et al 2014, the contents of each of which are incorporated by reference herein in their entirety for all purposes.

Embodiments of the present disclosure facilitate the ranking of file samples for all designated labels, simultaneously or substantially simultaneously, by implementing a hybrid approach that accommodates multiple labels, performs ranking of paired inputs within a single model, and detects "correlations" between the labels. Methods set forth herein can include the selective back-propagation of gradients of losses from labels for which a clearly identifiable preference exists, and/or the addition of a "masking layer" via which new/additional labels can be readily added (e.g., without introducing another, separate model).

Embodiments set forth herein can be viewed as improving pair-wise ranking models by incorporating multi-label functionality, to improve predictions (e.g., of relevance of documents and/or portions thereof) by taking into account correlations between labels, and/or by facilitating the addition of new labels to an existing ranking model. Systems and methods of the present disclosure provide an improvement to ranking efficiency, speed and accuracy, when compared with known ranking systems, in that human inputs are reduced, the addition and rapid training of new fields are permitted, and repeated, automatic model refinement can be achieved through the capture of user preferences, for improved ranking accuracy. Providing the foregoing capabilities in a single model can also reduce the amount of storage, maintenance, and computing power used, as compared with multiple-model approaches. Moreover, when adding a new class (for which little or no training data is available) to the model, positions of a neural network that have already been trained can be leveraged.

In some implementations, a ranking system includes a Siamese network that selectively back-propagates gradients of losses from labels when a clear preference, between two inputs and for a given class, is detected. As used herein, a Siamese network is a pairwise network that can be used to compare two or more inputs to detect/identify which of the two or more inputs is more relevant to a given application (e.g., paragraph 2 may be more relevant than paragraph 1 to a "contract start date" field). In machine learning, a loss function is a function that maps an event or values of one or more variables onto a real number, representing some "cost" associated therewith, and is typically sought to be minimized. The loss value (also referred to herein as "cross-entropy loss," or "log loss") calculated using a loss function can represent the performance of a classification/ranking model whose output is a probability value between 0 and 1. As the predicted probability decreases, the loss can increase rapidly. The gradient of loss represents a rate of change of loss of a model during machine learning. The Siamese network can be implemented, for example, via an additional network layer, such that the weights of the Siamese network only update when clear preferences are detected. Multi-label Siamese networks can improve a ranking system/model's predictive accuracy, for example by accounting for correlations between labels. Such multi-label Siamese networks can also improve the ease with which new labels can be added and trained, by leveraging existing input and hidden layers such that only a single node (or "neuron") of the output layer is updated.

In some embodiments, a ranking system includes a mask that facilitates a multi-label setting by passing or blocking individual losses for each label. A determination as to whether to pass or to block a particular loss can be based, for example, on whether a clear preference has been detected between two ground truths. "Ground truth" refers to information that, rather than being inferred or predicted, has actually been observed, and as used herein, can refer, for example, to an actual interaction between a system user and the ranking system (e.g., a user selection of a document portion during an auditing or document review process).

In some embodiments, a multi-label ranking system is designed to identify the most relevant portion(s) of a file/document for a given field (e.g., contract start date, contract end date, contract termination options, etc.) based on user preference data. The system can be programmed to selectively (for each of multiple fields) turn off (deactivate) the gradient when no preference (or when there is an insufficiently high preference) exists between input candidate document portions (referred to herein as "inputs"), and/or turn on (activate) the gradient when a preference exists between the inputs, such that training is performed only under the circumstance that a clear preference exists between the inputs. The assessment of preference and subsequent adjustment (activation or deactivation) of the gradient can be performed for each of the fields for a given file/document, concurrently or substantially concurrently. The gradient can be used to minimize loss from labels.

In some implementations, the file being ranked is a contract, and the ranking is performed in the context of a contract review of an audit. Although shown and described herein for use in ranking text files or portions thereof (e.g., in the context of document auditing), multi-label embodiments of the present disclosure can also be used for ranking in the contexts of natural language, image recognition, and/or search systems.

In some embodiments, a multi-label ranking system calculates a score for a document or portion thereof, with higher scores representing higher relevancy. The multi-label ranking system can then (e.g., automatically/autonomously) compare the calculated score with labelled training data and/or real-life ground truths associated with the document to determine an accuracy of the score. If the accuracy of the score is not within an acceptable accuracy range, the multi-label ranking system can adjust the weights as part of the learning process. Once the multi-label ranking system has been fully trained (e.g., once the model has converged), inferences can be made based on individual inputs (i.e., pair of inputs no longer need to be provided to the multi-label ranking system for purposes of training).

Figure 1:
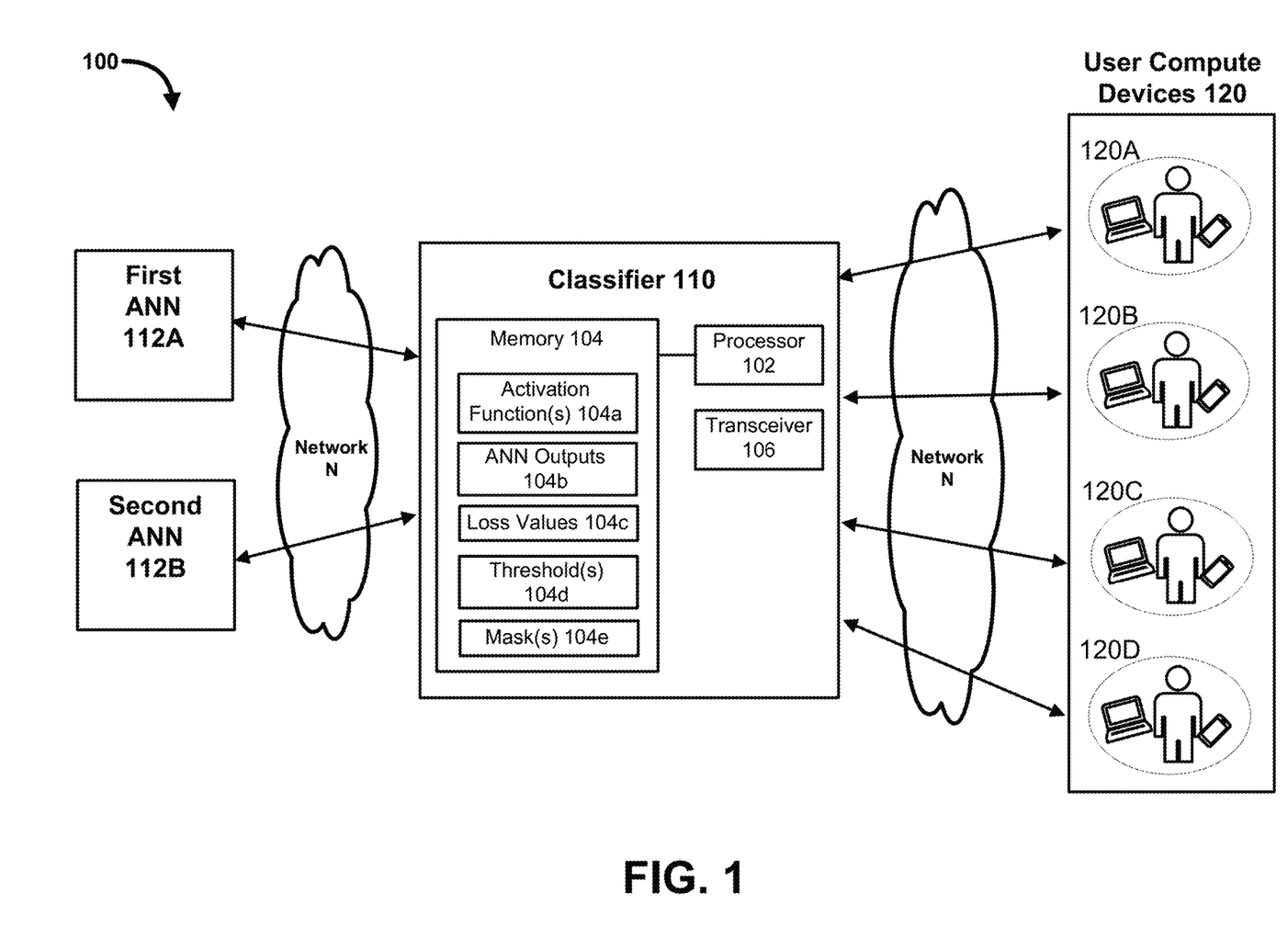
FIG. 1 is a diagram of a system for multi-label ranking, according to some embodiments.

FIG. 1 is a diagram of a system for multi-label ranking, according to some embodiments. As shown in FIG. 1, the system 100 includes a classifier 110 including a processor 102 having a memory 104 operably coupled thereto. The memory 104 stores one or more activation functions 104a, artificial neural network (ANN) outputs 104b, loss values 104c, thresholds 104d (optional), and one or more masks 104e. The memory 104 can also store instructions executable by the processor 102. The instructions can be implemented as computer code including, but not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code. The instructions can include instructions to cause the processor 102 to receive a plurality of artificial neural network (ANN) output pairs, to generate a mask based on the plurality of ANN output pairs by detecting whether a first ANN output of that ANN output pair is preferred over a second ANN output of that ANN output pair. The instructions can also include instructions to cause the processor 102 to set, in response to detecting a lack of preference between the first ANN output and the second ANN output, an indication that a portion of the mask will not cause an adjustment to a label weighting for that ANN output pair. The instructions can also include instructions to cause the processor 102 to set, in response to detecting a preference between the first ANN output and the second ANN output, an indication that the portion of the mask will cause an adjustment to the label weighting for that ANN output pair. The instructions can also include instructions to cause the processor 102 to transmit a signal, including the mask, from the processor 102 to each of a first ANN 112A (e.g., a feed-forward ANN or a convolutional neural network (CNN)) and a second ANN 112B (e.g., a feed-forward ANN or a CNN), such that the first ANN 112A and the second ANN 112B collectively update a ranking model hosted by the first ANN 112A and the second ANN 112B. The classifier 110 also includes a transceiver 106 for sending and/or receiving signals. The classifier 110 is communicably coupled (e.g., via a wireless or wired network N) with a first ANN 112A, a second ANN 112B, and user compute devices 120 (120A-120D). Each of the classifier 110, the first ANN 112A, the second ANN 112B, the processor 102, and the user compute devices 120A-120D can be implemented in software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools.

Figure 2A:
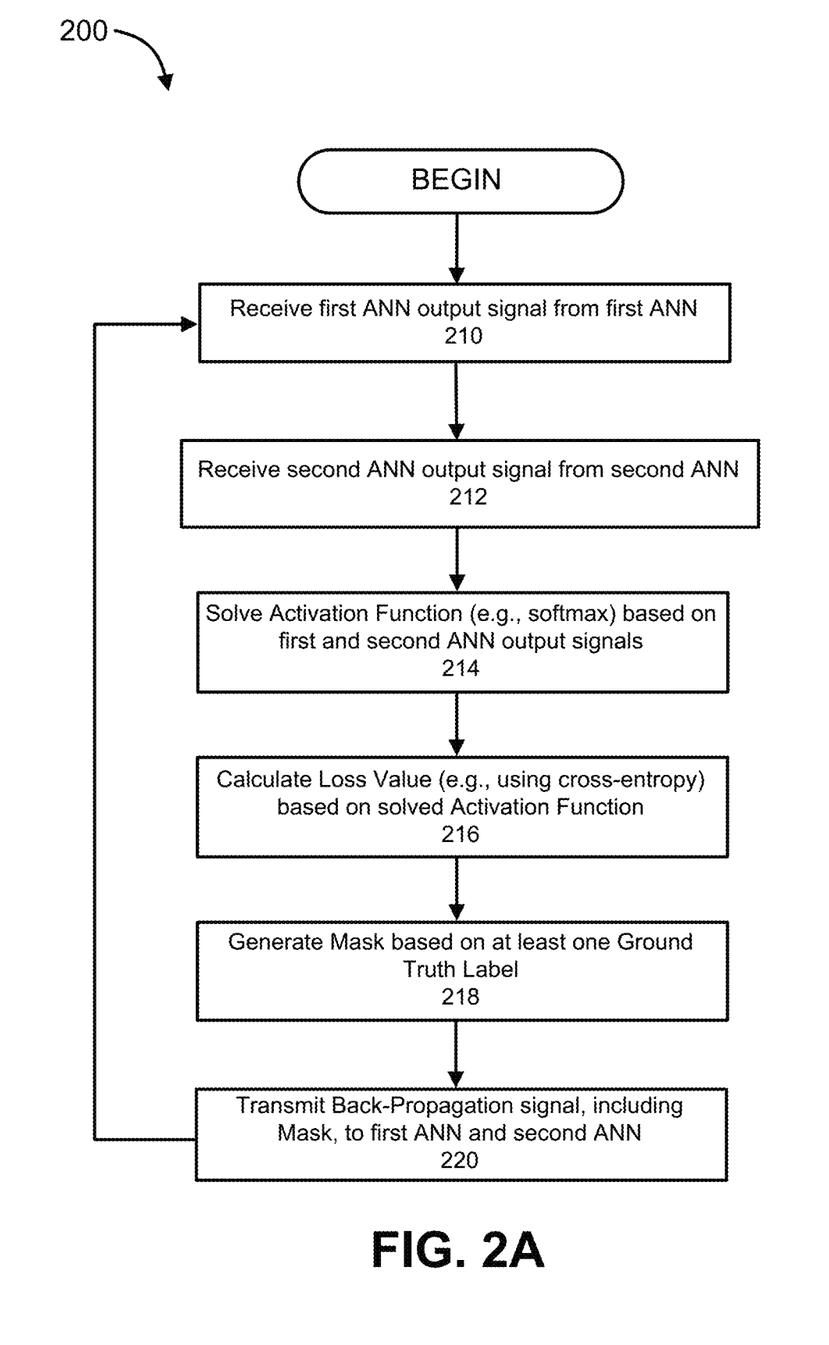
FIG. 2A is a flowchart showing a multi-label ranking refinement process, according to some embodiments.

FIG. 2A is a flowchart showing a multi-label ranking refinement process, according to some embodiments. As shown in FIG. 2A, the multi-label ranking refinement process 400 includes receiving, at 210 (e.g., at a processor, such as processor 110 of FIG. 1) and from a first ANN, a first ANN output signal representing a first ANN output pair associated with a first label. A second ANN output signal representing a second ANN output pair associated with a second label, the second label being different from the first label, is received at 212 from a second ANN different from the first ANN, optionally substantially concurrently with the first ANN output pair. In some embodiments, the first ANN and the second ANN collectively define at least a portion of a ranking model. At 214, an activation function (e.g., Softmax) is solved by the processor based on the first ANN output signal and the second ANN output signal, to produce a first solved activation function and a second activation function, respectively. A loss value is calculated (e.g., using cross-entropy) at 216 based on the first solved activation function and the second solved activation function. The loss value represents a predictive accuracy of the ranking model. At 218, a mask is generated based on at least one ground truth. A back-propagation signal, including a representation of the mask, is sent from the processor to each of the first set of ANNs and the second set of ANNs, at 220, such that the first set of ANNs and the second set of ANNs collectively refine the ranking model hosted by the first set of ANNs and the second set of ANNs. The process 200 can then reiterate steps 210-220 as needed, e.g., to achieve a desired level of accuracy in the predictive power of the collective model.

Figure 2B:
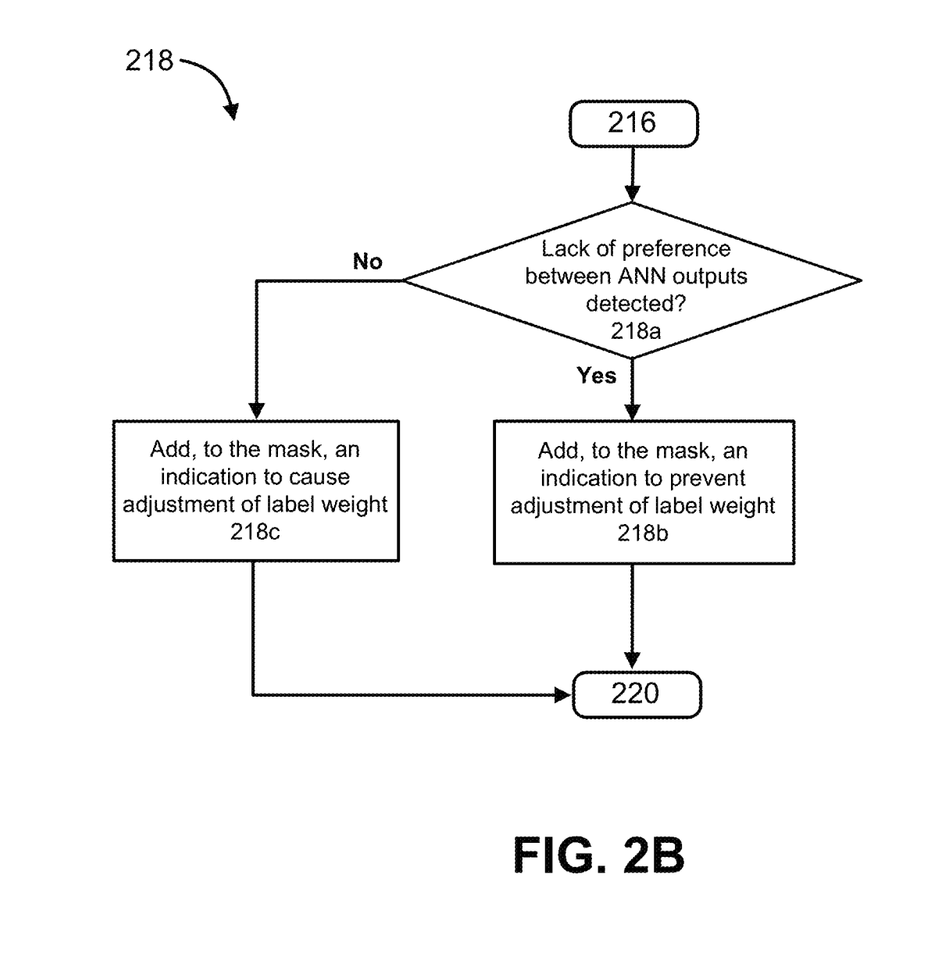
FIG. 2B is a flowchart showing a mask generation compatible with the process of FIG. 2A.

FIG. 2B is a flowchart showing a mask generation compatible with the process of FIG. 2A. As shown in FIG. 2B, the mask generation process 218 (preceded by the loss value calculation 216, and followed by transmission of the back-propagation signal 220, as discussed above with reference to FIG. 2A) can include assessing, at 218a, whether a lack of preference has been detected between ANN outputs (e.g., one or more ANN output pairs), i.e., whether a lack of preference for one of the outputs of a given output pair (when compared to the other), or whether a clear preference for one of the outputs of a given output pair (when compared to the other) has not been detected/established. If a lack of preference has been detected, an indication is added to the mask, at 218b, to prevent adjustment of an associated label weight of the mask. If a lack of preference is not detected, an indication is added to the mask, at 218c, to cause an adjustment to the associated label weight of the mask.

Figure 3:
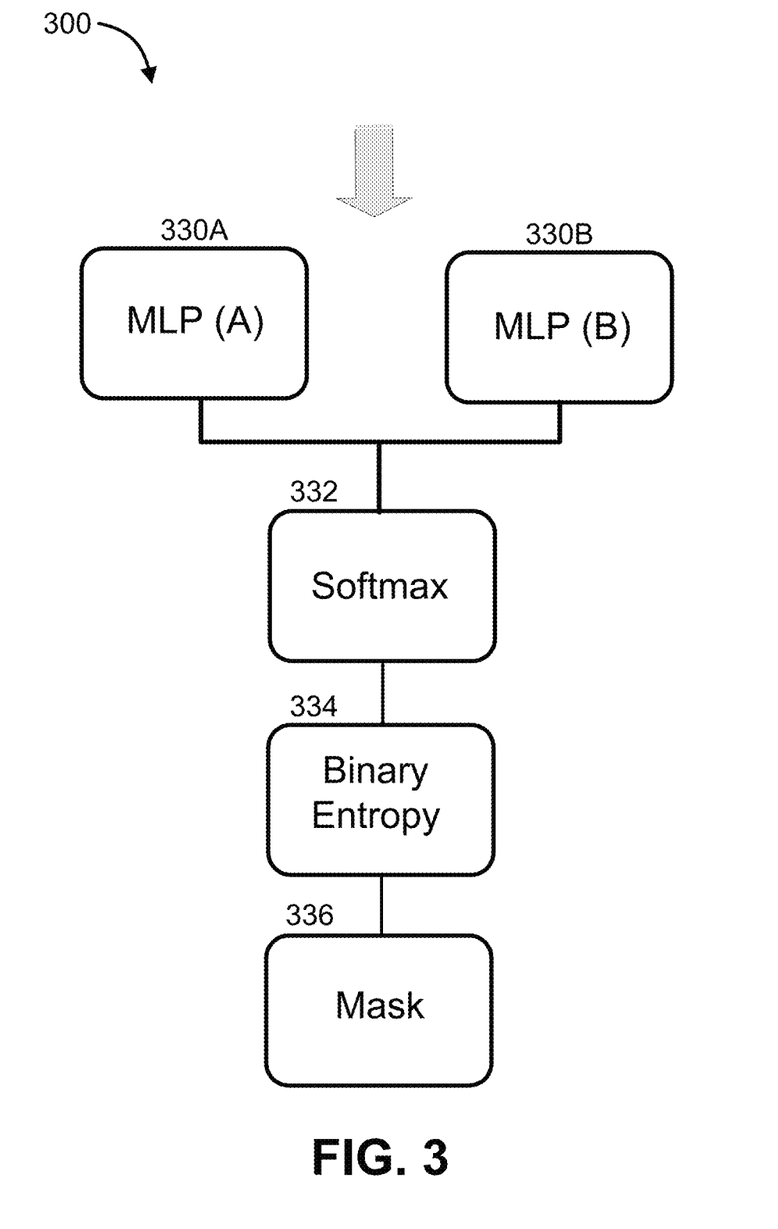
FIG. 3 is a flowchart showing loss layer operations, according to some embodiments.

FIG. 3 is a flowchart showing a particular implementation of a process similar to that of FIGS. 2A-2B, with loss layer operations, according to some embodiments. As shown in FIG. 3, the loss layer operations 300 (which can be performed, for example, using a processor such as processor 110 of FIG. 1) include generating and/or receiving outputs of each of two multilayer perceptrons (MLP (A) 330A and MLP (B) 330B) within a network (collectively, MLP output). An MLP is a type of ANN. As used herein, a multilayer perceptron (MLP) refers to a type of ANN having at least three layers of nodes. Except for the input nodes, each node is a neuron that uses a nonlinear activation function. MLP uses a supervised learning techniques called back-propagation for training purposes. An MLP can distinguish data that is not linearly separable. The MLP output can include one or more output pairs, each output pair being associated with a pair of labels. The MLP output can include Q outputs, where Q corresponds to a number of classifications, and the outputs can be represented as $\{f_1, f_2, \ldots, f_Q\}$. Outputs from MLP (A) 330A can be represented as $\{f^A_1, f^A_2, \ldots, f^A_Q\}$, and outputs from MLP (A) 330A can be represented as $\{f^B_1, f^B_2, \ldots, f^B_Q\}$. The MLP output is provided as input to a Softmax function at 332. Where multiple output pairs are received, a Softmax function is performed for each output pair. The Softmax function compares the received outputs of the output pair to determine/detect/predict a preference of one of the two outputs over the other. An example Softmax function is as follows:

$$q_i(x_i) = \text{softmax}(f^A_j, f^B_j)$$

The preference (or lack of a preference) can be represented, for example, as follows: if A is preferable: (0,1), if B is preferable: (1,0), and if no preference: (0,0). A binary entropy (also referred to herein as "cross-entropy") is then calculated, at 334, to determine an error or "loss" of the preference determination. The loss can be calculated, for example, by comparing one or more ground truth labels with the Softmax results and summing across the output pairs. Each ground truth label can be defined, for example, as follows:

$$p_j(x^A_i, x^B_i) = \{(1,0) \text{ if } x^A_i > x^B_i, (0,1) \text{ if } x^B_i > x^A_i, \text{ and } (0,0) \text{ otherwise}\}.$$

Figure 5:
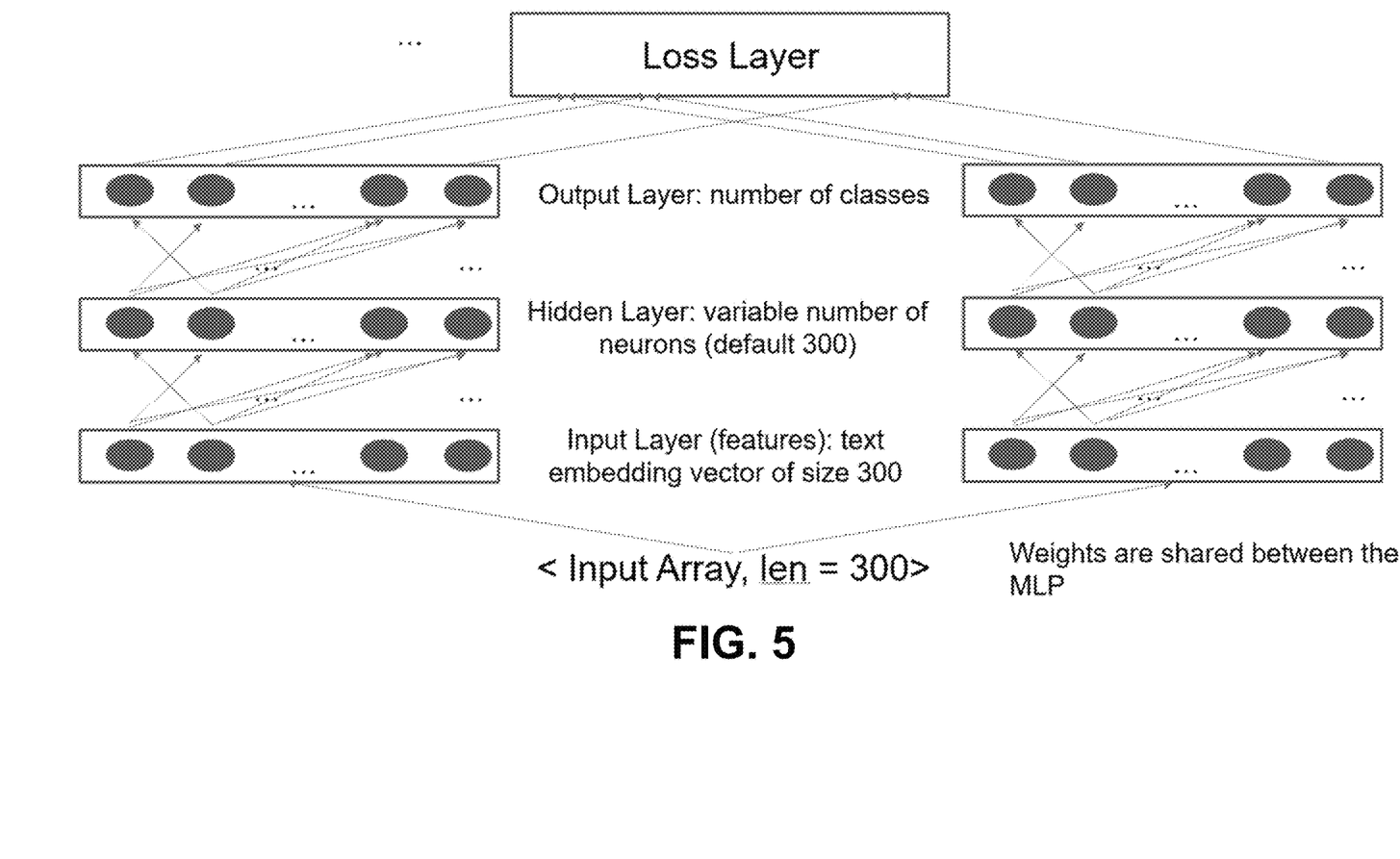
FIG. 5 is a diagram showing an example network architecture, according to some embodiments.

The preference and/or loss data is then used to generate a mask, at 336. The mask can be defined, for example, as follows:

$$\{m_1, m_2, \ldots m_Q\}$$

where $m_j = \{1 \text{ if } (x^A_i, x^B_i) = (1,0) \text{ or } (0,1) \text{ and } 0 \text{ otherwise}\}$ When generating the mask, if no preference was detected between the outputs of a given output pair, a corresponding portion of the mask will be "blocked" such that one or more weights associated with that mask portion cannot be changed. If preference was detected between the outputs of a given output pair, a corresponding portion of the mask will not be blocked, and may have a weight associated with that mask portion modified based on the corresponding preference and/or loss data. The correlation is captured in the chaining of the nodes, as shown and described below with respect to FIG. 5.

Although shown and described, with reference to FIG. 3, as applying a Softmax function, any other activation function (e.g., Maxout, binary step, logistic, Tan H, ArcTan, EllitSig, Softsign, inverse square root unit (ISRU), inverse square root linear unit (ISRLU), square nonlinearity (SQNL), rectified linear unit (ReLU), bipolar rectified linear unit (BreLU), leaky rectified linear unit (Leaky ReLU), parametric rectified linear unit (PReLU), randomized leaky rectified linear unit (RReLU), exponential linear unit (ELU), scaled exponential linear unit (SELU), S-shaped rectified linear activation unit (SreLU), adaptive piecewise linear (APL), SoftPlus, bent identity, Sigmoid Linear Unit (SiLU), SoftExponential, Soft Clipping, Sinusoid, Sinc, Gaussian), algorithm or method of comparing the outputs of each received output pair can be performed as an alternative to or in addition to Softmax.

Although shown and described, with reference to FIG. 3, as using cross-entropy, any other loss determination method (e.g., mean-squared error (MSE), mean absolute error (MAE), huber loss, hinge loss, etc.) can be performed as an alternative to or in addition to cross-entropy. Alternatively or in addition, although shown and described, with reference to FIG. 3, as using MLPs, some or all of the MLPs can be substituted with convolutional neural networks (CNNs) as part of the ranking system. Variations in input type and size, number of layers, number of nodes in each layer, type of activation function(s), number of activation function(s), type of loss function(s), and/or number of loss functions can be made without departing from the scope of the present disclosure.

Figure 4:
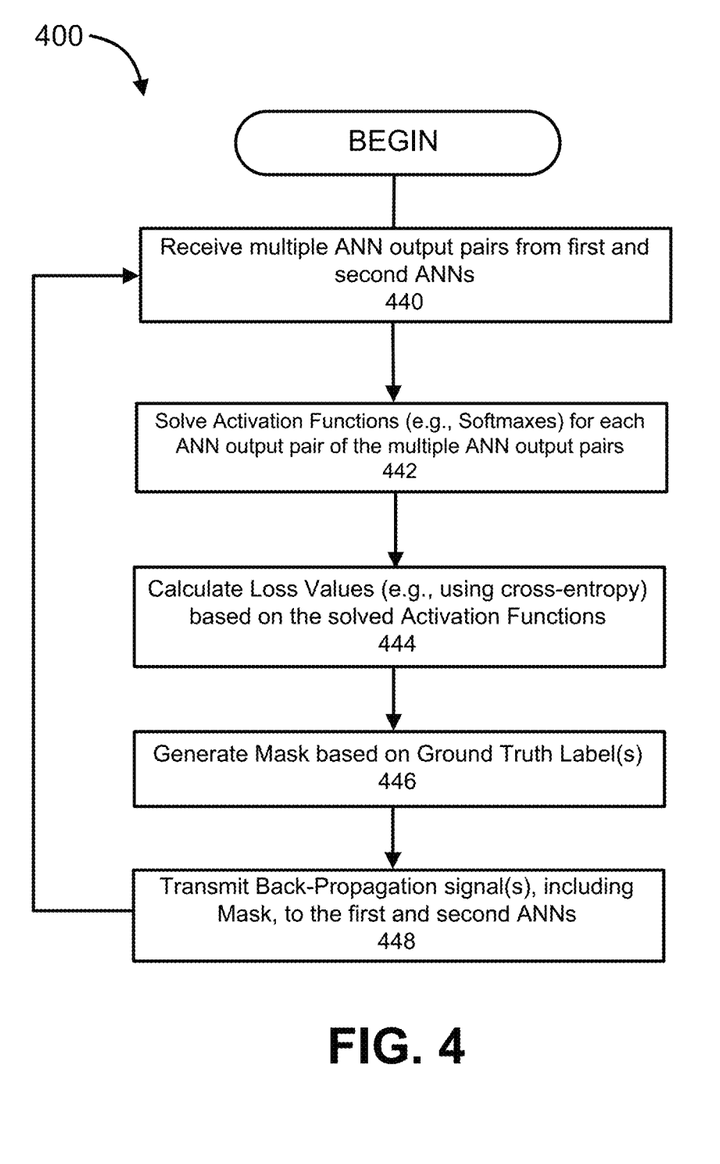
FIG. 4 is a flowchart showing a multi-label ranking refinement process, according to some embodiments.

FIG. 4 is a flowchart showing a further implementation of a process similar to that of FIGS. 2A-2B, according to some embodiments. As shown in FIG. 4, the multi-label ranking refinement process 400 includes receiving, at 440 (e.g., at a processor, such as processor 110 of FIG. 1) and from multiple (e.g., first and second) ANNs, multiple ANN output pairs associated with one or more labels. At 442, activation functions (e.g., Softmaxes) are solved for each ANN output pair from the multiple ANN output pairs, to produce associated activation functions. Loss values are calculated (e.g., using cross-entropy) at 444 based on the solved activation functions. At 446, a mask is generated based on at least one ground truth label. A back-propagation signal, including a representation of the mask, is transmitted/sent from the processor to each of the ANNs, at 448, e.g., such that a first ANN and a second ANN from the multiple ANNs collectively refine a ranking model hosted by at least the first and second ANNs. The process 400 can then reiterate steps 440-448 as needed, e.g., to achieve a desired level of accuracy in the predictive power of the collective model. The trained ranking system can then be used to identify, highlight, flag or otherwise alert a user to portions of a file of interest (e.g., text within an electronic file), for example in response to a user input signal representing a field or class of data being sought by the user within the file. For example, when a user is reviewing an electronic contract, the user can provide an input "contract start date" to the ranking system (e.g., via data entry or selection/actuation of a graphical object via a graphical user interface (GUI)), and in response to the input, the ranking system can identify/detect a portion of the contract predicted most likely to correspond with the contract start date.

FIG. 5 is a diagram showing an example network architecture for a multi-label ranking system, according to some embodiments. In FIG. 5, blocks representing groupings of nodes are presented on the left-hand and right-hand sides ("network segments"), optionally in a mirrored configuration. Each network segment can be implemented as an MLP or any other ANN, a CNN, etc. Each of the nodes within a network segment can be connected via a network to each other node within that network segment. Although three distinct layers (an input layer, a hidden layer, and an output layer) are depicted, any number of additional layers (e.g., multiple hidden layers) can also be used and/or two or more of the layers can be combined for a given implementation. Nodes within the input layer (i.e., input nodes), in some embodiments, do not perform computations, but rather pass received inputs/data/information to the hidden layer. Nodes within the hidden layer (i.e., hidden nodes), in some embodiments, perform computations and transfer information (e.g., including computation results) to the output layer. The hidden layer can include, for example, between about 50 and about 1500 neurons, or about 50, about 100, about 200, about 300, about 500, about 1000, about 1500, from 300-500, from 500-1000, or from 1000-1500 nodes/neurons. Nodes within the output layer (i.e., output nodes), in some embodiments, perform computations and transfer information to the loss layer and/or to other portions of the networked ranking system. At the bottom of FIG. 5, an input array is sent to each network segment. An input array can have a characteristic length (e.g., 300 characters), and can represent a predetermined amount of text (e.g., a paragraph of an electronic document being analyzed). The input array can be transformed, for example, via matrix multiplication within the hidden layer and/or the output layer. The output layer can include a number of nodes that is equal to the number of classes, or that exceeds the number of classes (e.g., to serve as extras/spares to facilitate the addition of new classes). Each node in the hidden layer can feed data into a corresponding node in the output layer. Output from the output layer in FIG. 5 is sent/transmitted/passed to a loss layer, e.g., for loss calculations and/or the training of label weights. In some implementations, the number of nodes within each layer is the same, while in other implementations, the number of nodes within each layer differs. A number of nodes within any given layer can remain static, or can be reduced during operation.

All combinations of the foregoing concepts and additional concepts discussed herein (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method executed by an apparatus that includes a loss layer and a plurality of artificial neural networks (ANNs), the method comprising:
    receiving, via the loss layer and from a first plurality of ANNs, a plurality of signals representing a first plurality of ANN output pairs uniquely associated with a first label and not associated with a second label different from the first label;
    receiving, via the loss layer, from a second plurality of ANNs different from the first plurality of ANNs, and substantially concurrently with the first plurality of ANN output pairs, a signal representing a second plurality of ANN output pairs uniquely associated with the second label and not associated with the first label;
    solving a first activation function based on the first plurality of ANN output pairs to produce a first solved activation function;
    solving a second activation function based on the second plurality of ANN output pairs to produce a second solved activation function;
    calculating, via the loss layer, loss values based on the first solved activation function and the second solved activation function;
    generating, via the loss layer, a mask after calculating the loss values, the generating the mask including, for each portion from a plurality of portions included in the mask,
        setting an indication that that portion of the mask will not cause an adjustment to a label weighting for at least one of an output pair from the first plurality of ANN output pairs associated with that portion or an output pair from the second plurality of ANN output pairs associated with that portion in response to detecting, a lack of preference between the output pair from the first plurality of ANN output pairs associated with that portion and the output pair from the second plurality of ANN output pairs associated with that portion,
        setting an indication that that portion of the mask will cause the adjustment to the label weighting in response to detecting, a preference of the output pair from the first plurality of ANN output pairs associated with that portion over the output pair from the second plurality of ANN output pairs associated with that portion, and
        setting the indication that that portion of the mask will cause the adjustment to the label weighting in response to detecting, a preference of the output pair from the second plurality of ANN output pairs associated with that portion over the output pair from the first plurality of ANN output pairs associated with that portion; and
    transmitting a signal, including a representation of the mask, from the processor to each of the first plurality of ANNs and the second plurality of ANNs, such that the first plurality of ANNs and the second plurality of ANNs collectively refine a ranking model hosted by the first plurality of ANNs and the second plurality of ANNs.

2. The method of claim 1, wherein at least one of the first activation function or the second activation function includes a softmax function.

3. The method of claim 1, wherein the calculating the loss values is performed using cross-entropy.

4. The method of claim 1, wherein calculating the loss values is further based on a ground truth associated with at least one of the first label or the second label.

5. The method of claim 1, wherein the adjustment includes setting that portion of the mask to one.

6. The method of claim 1, wherein the ranking model is configured to identify a most relevant portion of a document for a given field based on user preference data.

7. The method of claim 1, wherein at least one of the first plurality of ANNs or the second plurality of ANNs includes a feed-forward ANN, at least one of the first plurality of ANNs or the second plurality of ANNs includes a multilayer perceptron (MLP), or at least one of the first plurality of ANNs or the second plurality of ANNs includes a convolutional neural network (CNN).

8. The method of claim 1, wherein each portion from the plurality of portions is either 0 or 1 after the generating.

9. The method of claim 1, wherein the ranking model is configured to compare a plurality of inputs to rank relevancy of each input from the plurality of inputs to an application.

10. An apparatus, comprising:
    a processor, a loss layer, and a plurality of artificial neural networks (ANNs), the processor configured to;
    receive, via the loss layer, a plurality ANN output pairs, each ANN output pair from the plurality of ANN output pairs associated with a different label from a plurality of labels;
    generate, via the loss layer, a mask after calculating a loss value based on a solved activation function and based on the plurality of ANN output pairs, the generating including, for each portion from a plurality of portions included in the mask:
    for each ANN output pair from the plurality of ANN output pairs:
        detecting whether a first ANN output of that ANN output pair is preferred over a second ANN output of that ANN output pair,
        in response to detecting a lack of preference between the first ANN output and the second ANN output, setting an indication that that portion of the mask will not cause an adjustment to a label weighting for that ANN output pair,
        in response to detecting a preference of the first ANN output over the second ANN output, setting an indication that that portion of the mask will cause the adjustment to the label weighting for that ANN output pair, and in response to detecting a preference of the second ANN output over the first ANN output, setting the indication that that portion of the mask will cause the adjustment to the label weighting for that ANN output pair; and transmit a signal, including the mask, from the processor to each of the first ANN and the second ANN, such that the first ANN and the second ANN collectively update a ranking model hosted by the first ANN and the second ANN.

11. The apparatus of claim 10, wherein the generating the mask includes solving activation functions for each ANN output pair from the plurality of ANN output pairs.

12. The apparatus of claim 10, wherein the generating the mask is based on a ground truth associated with a label from the plurality of labels.

13. The apparatus of claim 10, wherein the plurality of ANN output pairs are received from a Siamese network including a first ANN and a second ANN.

14. The apparatus of claim 10, wherein each label from the plurality of labels is associated with a portion of a contract.

15. A method executed by an apparatus that includes a loss layer and a plurality of artificial neural networks (ANNs), the method comprising:

receiving, via the loss layer and from the plurality of ANNs, a plurality of signals representing an associated plurality of ANN output pairs associated with a label;

calculating, via the loss layer, loss values based on the plurality of ANN output pairs;

defining, via the loss layer, a mask after calculating the loss values, the defining including, for each portion from a plurality of portions included in the mask:

for each ANN output pair from the plurality of ANN output pairs:

detecting whether a first ANN output of that ANN output pair is preferred over a second ANN output of that ANN output pair, in response to detecting a lack of preference between the first ANN output and the second ANN output, setting an indication that that portion of the mask will not cause an adjustment to a label weighting for that ANN output pair, in response to detecting a preference of the first ANN output over the second ANN output, setting an indication that that portion of the mask will cause the adjustment to the label weighting for that ANN output pair, and in response to detecting a preference of the second ANN output over the first ANN output, setting the indication that that portion of the mask will cause the adjustment to the label weighting for that ANN output pair; and transmitting a signal, including a representation of the mask, from the processor to each ANN from the plurality of ANNs, to update a ranking model of the plurality of ANNs.

16. The method of claim 15, wherein the plurality of signals representing the associated plurality of ANN output pairs associated with the label is a first plurality of signals, the mask is a first mask, and the signal is a first signal, the method further comprising:

receiving, at the processor, from the plurality of ANNs, and after the first plurality of signals, a second plurality of signals representing an associated plurality of ANN output pairs associated with the label;

defining, at the processor and after the first mask, a second mask based on the second plurality of signals; and transmitting a second signal, including the second mask, from the processor to each ANN from the plurality of ANNs, for further refinement of the ranking model of the plurality of ANNs.

17. The method of claim 15, wherein at least one ANN from the plurality of ANNs is a multilayer perceptron (MLP).

18. The method of claim 15, wherein the ranking model is configured to identify a most relevant portion of a document for a given field based on user preference data.

19. The method of claim 15, wherein each ANN output pair from the plurality of ANN output pairs is generated by an associated multilayer perceptron (MLP).

20. The method of claim 15, wherein the plurality of ANN output pairs is associated with at least two different labels.

\* \* \* \* \*

UNITED STATES PATENT AND TRADEMARK OFFICE
CERTIFICATE OF CORRECTION

PATENT NO. : 11,972,345 B2
APPLICATION NO. : 16/381505
DATED : April 30, 2024
INVENTOR(S) : Vincent Poon et al.

It is certified that error appears in the above-identified patent and that said Letters Patent is hereby corrected as shown below:

In the Specification

Column 7, Line 7: "tion (e.g., Maxout, binary step, logistic, Tan H, ArcTan" should read -- tion (e.g., Maxout, binary step, logistic, Tanh, ArcTan --

Column 9, Line 56: "ations-in-part, divisional s, and/or the like thereof. As such," should read -- ations-in-part, divisionals, and/or the like thereof. As such, --

In the Claims

Column 11, Line 60 (Claim 1, Line 34): "detecting, a lack of preference between the output" should read -- detecting a lack of preference between the output --

Column 11, Line 67 (Claim 1, Line 41): "response to detecting, a preference of the output pair" should read -- response to detecting a preference of the output pair --

Column 12, Line 7 (Claim 1, Line 48): "response to detecting, a preference of the output pair" should read -- response to detecting a preference of the output pair --

Signed and Sealed this
Eighteenth Day of June, 2024

Katherine Kelly Vidal
*Director of the United States Patent and Trademark Office*